(12) United States Patent
Flanagan

(10) Patent No.: US 7,005,067 B2
(45) Date of Patent: Feb. 28, 2006

(54) DISC-TYPE FILTRATION APPARATUS INCLUDING DISCHARGE COLLECTOR INTERNAL TO PRESSURE VESSEL AND METHOD FILTRATION

(75) Inventor: Peter J. Flanagan, Sandy, UT (US)

(73) Assignee: GL&V Management Hungary KFT, Egressy (HU)

( * ) Notice: Subject to any disclaimer, the term of this patent is extended or adjusted under 35 U.S.C. 154(b) by 113 days.

(21) Appl. No.: 10/450,762

(22) PCT Filed: Dec. 6, 2001

(86) PCT No.: PCT/US01/46987

§ 371 (c)(1),
(2), (4) Date: Jun. 12, 2003

(87) PCT Pub. No.: WO02/47792

PCT Pub. Date: Jun. 20, 2002

(65) Prior Publication Data

US 2004/0045913 A1 Mar. 11, 2004

Related U.S. Application Data

(60) Provisional application No. 60/255,213, filed on Dec. 12, 2000.

(51) Int. Cl.
*B01D 33/21* (2006.01)

(52) U.S. Cl. .................. 210/248; 210/331; 210/332; 210/396; 210/398; 210/407

(58) Field of Classification Search ............ 210/248, 210/330, 331, 332, 391, 394, 396, 398, 407, 210/408
See application file for complete search history.

(56) References Cited

U.S. PATENT DOCUMENTS

| 2,079,755 A | 5/1937 | Wood | |
|---|---|---|---|
| 2,655,265 A | * 10/1953 | Little | 210/398 |
| 2,699,872 A | 1/1955 | Kelsey | |
| 2,899,066 A | 8/1959 | Peterson et al. | |
| 3,096,278 A | 7/1963 | Francom | |
| 3,193,105 A | 7/1965 | Putnam | |
| 3,217,882 A | 11/1965 | Ogletree | |
| 3,252,577 A | 5/1966 | Anderson | |
| 3,270,888 A | 9/1966 | Anderson | |
| 3,591,009 A | * 7/1971 | Luthi et al. | 210/247 |
| 4,056,473 A | 11/1977 | Nilsson | |
| 4,086,168 A | 4/1978 | Moore | |
| 4,929,355 A | * 5/1990 | Ragneg.ang.rd et al. | 210/784 |
| 5,849,202 A | 12/1998 | Koch et al. | |
| 6,063,294 A | 5/2000 | Martensson et al. | |
| 6,283,306 B1 | * 9/2001 | Nilsson | 210/391 |
| 2004/0045913 A1 | * 3/2004 | Flanagan | 210/780 |

FOREIGN PATENT DOCUMENTS

CA  1 192 142  8/1985
WO  WO 90/10490  9/1990

OTHER PUBLICATIONS

EIMCO ClariDisc Filter, Baker Process, 1996, 2 pages.
Kvaemer Pulping, CAUSTEC PDW Filter, Dec. 1996, 8 pages.
International Search Report dated Mar. 26, 2002.

* cited by examiner

*Primary Examiner*—Robert James Popovics
(74) *Attorney, Agent, or Firm*—TraskBritt

(57) ABSTRACT

A positive pressure disc-type filtration apparatus including a collection trough internal to the cylindrical pressure vessel housing the filter discs. The collection trough is entirely disposed within the cylinder of the pressure vessel and configured and located to receive and direct filter cake removed from the discs and then reslurried and sluiced toward the center of the trough using jets of liquid, to be discharged longitudinally centrally through a single outlet extending downwardly from the trough and through the wall of the pressure vessel. A method of filtration is also disclosed.

13 Claims, 3 Drawing Sheets

DISC-TYPE FILTRATION APPARATUS INCLUDING DISCHARGE COLLECTOR INTERNAL TO PRESSURE VESSEL AND METHOD FILTRATION

CROSS-REFERENCE TO RELATED APPLICATIONS

This application claims the benefit of U.S. Provisional Patent Application Ser. No. 60/255,213, filed Dec. 12, 2000 for DISC-TYPE FILTRATION APPARATUS INCLUDING DISCHARGE COLLECTOR INTERNAL TO PRESSURE VESSEL AND METHOD OF FILTRATION via international PCT Application No. PCT/US01/46987, filed Dec. 6, 2001.

BACKGROUND OF THE INVENTION

1. Field of the Invention

The present invention relates to disc-type filtration apparatus employed for separation of liquid from a suspension or slurry, such as a lime mud. More specifically, the invention relates to a disc-type filtration apparatus housed within a pressure vessel and employing a positive pressure in conjunction with filter discs to effect the liquid separation, as well as a method of filtration.

2. State of the Art

Disc-type filtration apparatus are well known, and have been employed for decades. In its simplest form, such an apparatus employs one or more hollow filter discs, the sidewalls of which discs are either formed of a porous material or define a frame covered with a porous cover, commonly termed a filter cloth. The degree of porosity is selected for the suspension to be filtered, considering the viscosity of the liquid component as well as the particle size or sizes of the solid component. The discs are usually circumferentially sectored into compartments, are oriented vertically and mutually laterally spaced along a tube extending along a horizontal axis. The interiors of the disc sectors are in communication with the interior of the tube. During operation, the discs are rotated about the longitudinal axis so as to become coated with the suspension. A positive pressure differential is created between the exteriors of the discs and the interiors thereof, to draw much of the liquid component of the suspension coating the disc exteriors into the interiors and significantly reducing the liquid content of the suspension on the disc exteriors to form a "cake." The cake is then removed from the disc exteriors.

Two principal approaches have been used to create the pressure differential between the disc interiors and exteriors. In one approach, exemplified by the teachings of U.S. Pat. Nos. 2,699,872 and 2,899,066, a vacuum is drawn in the tube and the exteriors of the discs are at ambient atmospheric pressure. A currently more favored approach, due to its ability to provide a greater pressure differential, particularly in the case of large, multi-disc filters, is to deploy the filter discs within a pressure vessel which is pressurized above ambient, as by an air compressor. This latter approach is exemplified by the teachings of U.S. Pat. Nos. 2,079,755; 3,252,577; 5,849,202; 6,063,294; Canadian Patent No. 1,192,142 and International Patent Application No. WO 90/10490. A commercially available filtration apparatus of the latter type is offered by EIMCO Process Equipment Co. (formerly Baker Process) of Salt Lake City, Utah, assignee of the present invention, as the ClariDisc® Filter. Another commercially available apparatus of the latter type is offered by Kvaerner Pulping AB of Karlstad, Sweden, as the CAUSTEC® PDW™ filter.

The design of the aforementioned ClariDisc® Filter has been well accepted by customers, as the solids from this filter (comprising filter cake which has been reslurried), are collected in a sloping outlet trough portion integral with and protruding beyond the cylindrical envelope of a cylindrical pressure vessel portion housing the discs, and discharged from the pressure vessel through a single outlet or multiple outlets. This is in contrast to the CAUSTEC® PDW™ filter, which uses a plurality of discharge outlets extending from the exterior of the pressure vessel, one outlet for each disc. The CAUSTEC® PDW™ filter is unduly complex and expensive to both build and deploy, due to the use of multiple outlets extending from the cylindrical pressure vessel portion. However, it is also somewhat costly to design and manufacture the trough and outlet assembly for the ClariDisc® Filter, since it functions as part of the outer wall of the pressure vessel and, therefore, must comply with certain governmental or professional engineering standards, the latter exemplified by the American Society of Mechanical Engineers (ASME) Section 8 Pressure Vessel Code.

BRIEF SUMMARY OF THE INVENTION

The present invention provides a positive pressure disc-type filtration apparatus including a collection trough internal to a cylindrical pressure vessel housing the filter discs. The collection trough for the inventive apparatus is entirely disposed within the cylinder or cylindrical envelope of the pressure vessel and thus may be configured and located without concern for pressure differentials to receive and direct filter cake removed from the discs and then reslurried and sluiced toward the center of the trough using flowing liquid, to be discharged longitudinally centrally through a single outlet extending downwardly from the trough and through the side wall of the pressure vessel cylinder.

The use of a cylindrical pressure vessel having a single outlet provided by the design of the filtration apparatus of the present invention results in a much lower design and fabrication cost for the pressure vessel, even if a slightly larger cylinder diameter for a given disc diameter is required. In addition, relocation of the trough within the pressure vessel allows for the height of the filtration apparatus to be significantly reduced for easier placement and reduced installation costs.

The present invention also encompasses a method of filtration wherein a suspension may be separated within a cylindrical envelope of a pressure vessel into filter cake and filtrate at a plurality of laterally spaced locations and the filter cake collected from the plurality of spaced locations to a single location within the cylindrical envelope for discharge from the pressure vessel.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
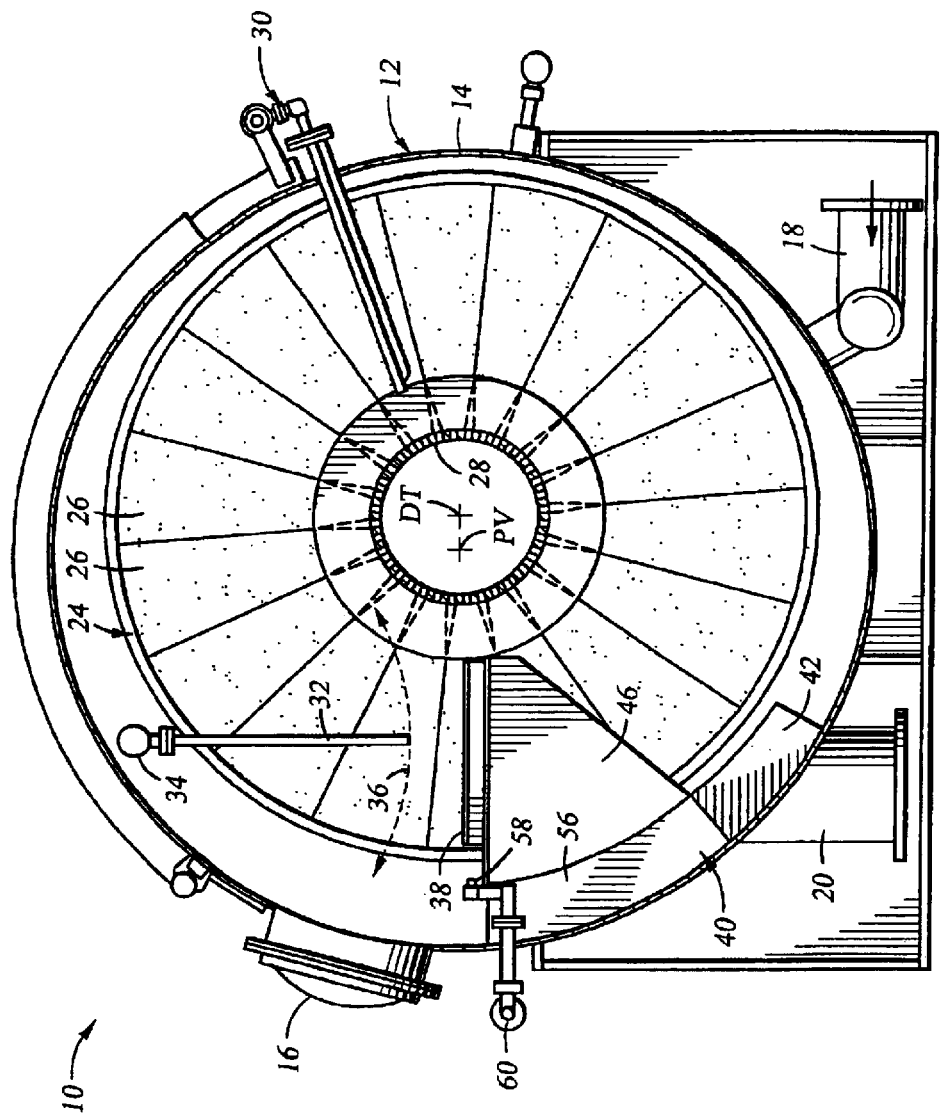
FIG. 1 is a transverse sectional view of the filtration apparatus of the present invention.

Referring now to the drawing figures, filtration apparatus 10 of the present invention includes a pressure vessel 12 having a substantially cylindrical envelope and defined in part by side wall 14, which substantially defines a cylinder concentric with a longitudinal vessel axis PV. Access hatches 16, slurry inlet conduit 18 and filter cake (also termed "mud cake") outlet conduit 20 extend through the side wall 14. A plurality of filter discs 24 (for example, and in this instance, six) are disposed within pressure vessel 12. The filter discs 24 each include multiple sectors 26 as known in the art, which communicate with the interior of one or more central filtrate discharge tubes 28 (a single tube being employed in this embodiment), an end of which (not shown) also extends through an end of pressure vessel 12 to effectuate removal of the liquid component of the suspension under filtration drawn therefrom under differential pressure through filter cloths disposed on the exteriors of the sectors 26 which collectively form the filter discs 24. It should be noted that, in the preferred embodiment the axis DT of the filtrate discharge tube 28 is laterally offset from the longitudinal axis PV of the pressure vessel 12. A disc wash assembly 30 is associated with each filter disc 24, as is a high pressure shower assembly 32 for disc cleaning, the latter movable by drive assembly 34 in an oscillating fashion through arc 36 as shown in FIG. 1. A discharge scraper 38 in the form of doctor blades flanks each filter disc 24 for removal of mud cake from the exterior thereof. Such an apparatus as described to this point is entirely conventional, as is its operation. Therefore, no further description of these features is required.

Figure 2:
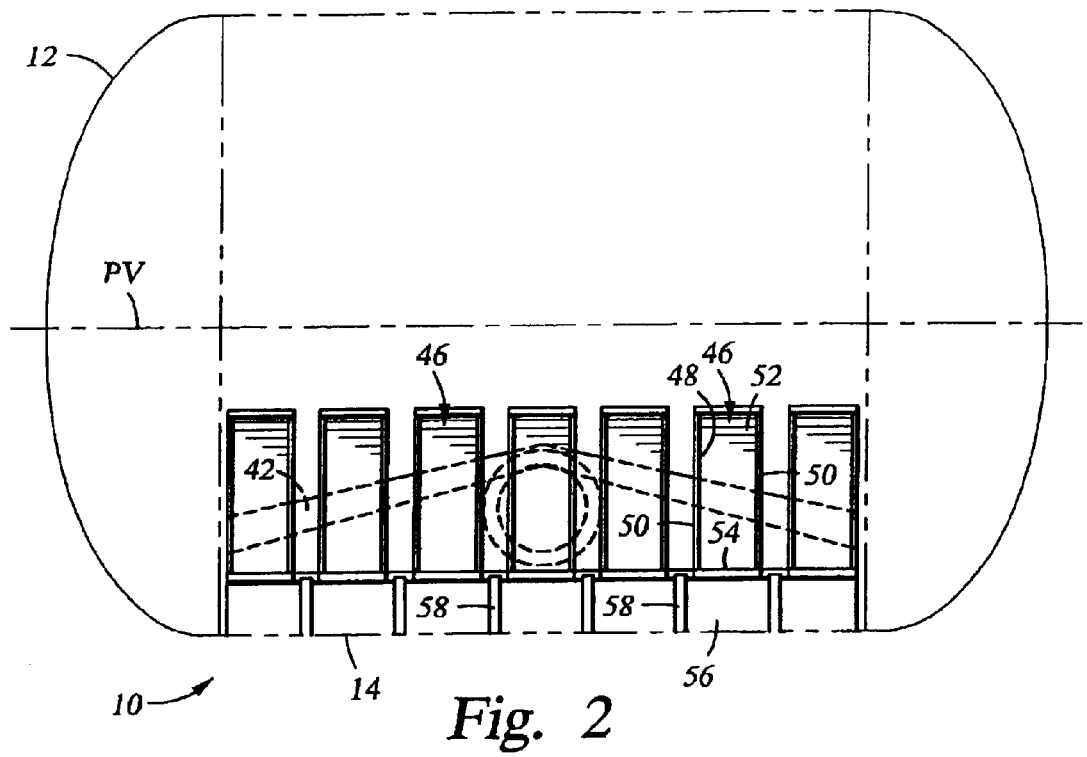
FIG. 2 is a top view of a portion of the filtration apparatus of the present invention showing the collection trough disposed within the cylinder of the pressure vessel, with the pressure vessel shown in broken lines for clarity.
Figure 3:
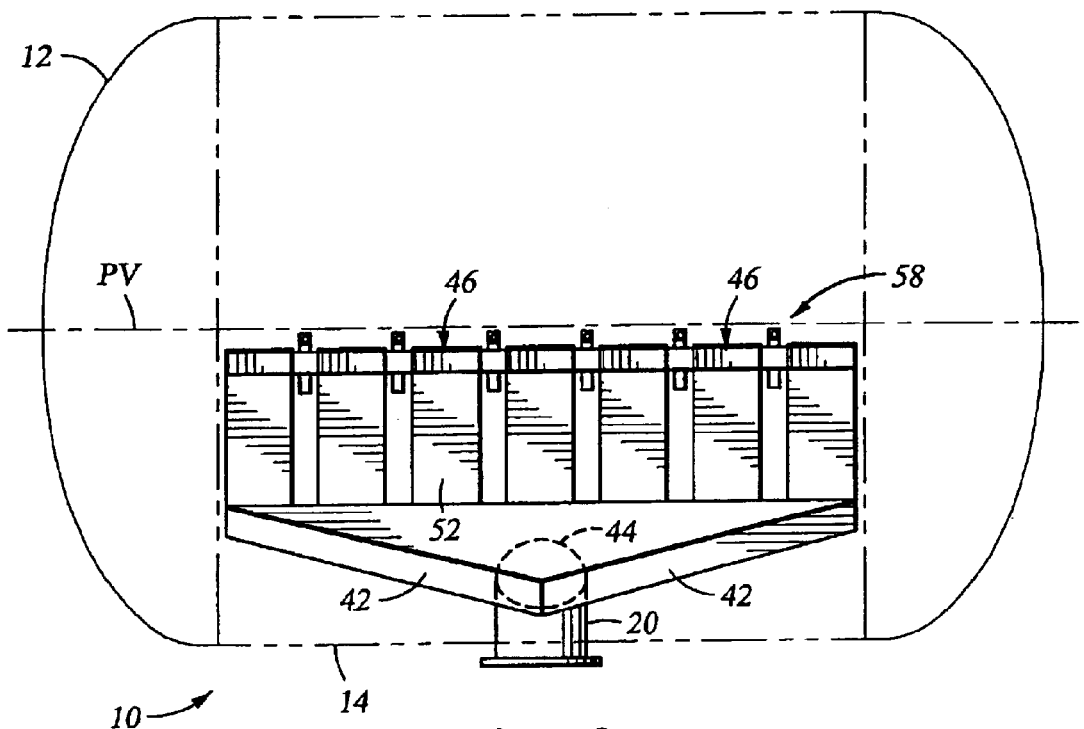
FIG. 3 is a side view of a lower portion of the filtration apparatus of the present invention showing the collection trough disposed within the cylinder of the pressure vessel, with the pressure vessel shown in broken lines for clarity.
Figure 4:
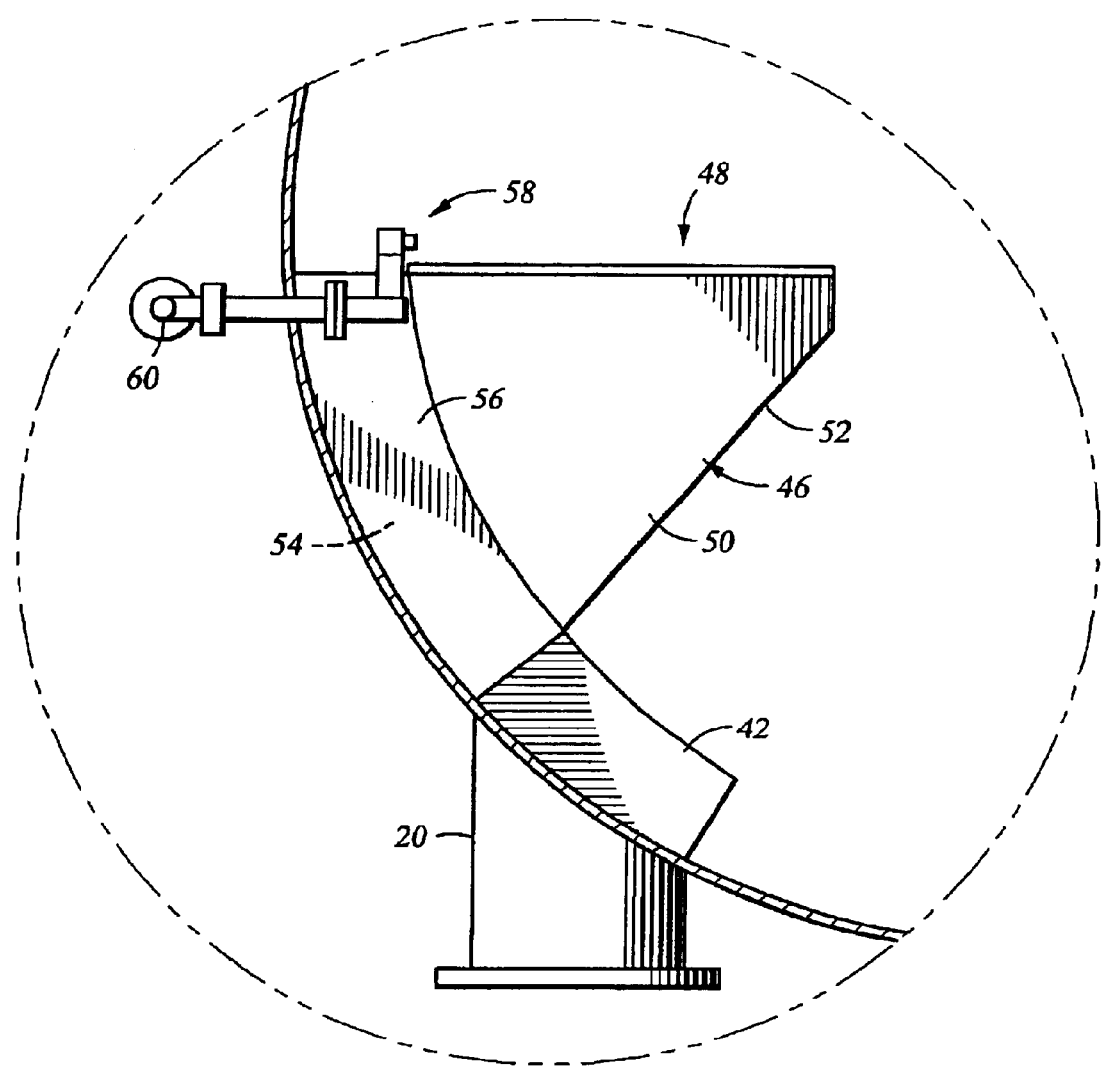
FIG. 4 is a side view of a discharge chute and the collection trough.

Disposed within pressure vessel 12 and partially laterally offset and extending below filter discs 24 (see FIG. 1) is a mud cake collection trough 40. Trough 40 is elongate and extends beyond the longitudinally outermost filter disc 24 of the row of filter discs 24. Trough 40 includes two inclined bottom walls 42 extending to the side wall 14 of pressure vessel 12 and sloping downwardly away from the horizontal midplane of pressure vessel 12 as well as toward the longitudinal center of the trough 40, where opening 44 communicates trough 40 with mud cake outlet conduit 20 (FIGS. 1 and 3). Trough 40 is further configured on its inner side with a plurality of discharge chutes 46, one substantially parallel to and flanking each side of each filter disc 24, to receive mud cake removed from the sides of the filter discs 24 by discharge scraper 38. Referring to FIGS. 2 and 4, discharge chutes 46 each include an elongated open mouth 48 at an upper extent thereof. Each open mouth 48 is of a length sufficient to receive mud cake falling from the discharge scrapers 38 substantially spanning the radius of the filter discs 24 between central filtrate discharge tube 28 and the filter discs' outer edges. More particularly, the open mouth 48 is desirably of a length which corresponds to a radial length of the filtering area of the sectors 26 (e.g., the distance between the outer radius of the filter discs 24 and the radius of the central filtrate discharge tube 28).

Each discharge chute 46 further includes two side walls 50 oriented substantially parallel to filter discs 24, and an inclined lower wall 52 extending between side walls 50 and sloping downwardly from mouth 48 and away from the center of pressure vessel 12 toward the side wall 14 thereof. The outer extents of discharge chutes 46 comprise openings 54 into the outer collection portion 56 of trough 40, wherein inclined bottom walls 42 lead to opening 44. Spray heads 58 fed by manifold 60 direct jets or other flows of fluid, such as, for example, water into discharge chutes 46 to prevent accumulation of mud cake on the side walls 50 thereof and to dilute the mud cake scraped off filter discs 24 to enhance sluicing thereof into opening 44 for discharge from pressure vessel 12 through outlet conduit 20.

No auger or other mechanical device is required to move the mud cake scraped from filter discs 24 to outlet conduit 20, the diluted mud cake flowing under gravity down inclined lower walls 52 to openings 54 and then along one of the bottom walls 42 of trough 40 to opening 44. The side walls 50 at each longitudinal end of trough 40 extend to the side wall 14 of pressure vessel 12 to complete trough 40.

The configuration of the trough 40 and discharge chutes 46 is such that the open mouths 48 are positioned above an intended slurry liquid level during operation of the filter 10. The discharge chutes 46 and trough 40 thus form a barrier separating discharged filter cake from the slurry contained in the pressure vessel 12. Such an arrangement allows the discharge and initial collection of the filter cake to take place entirely within the substantially cylindrical envelope of the pressure vessel 12 in a continuous filtration process.

It is noted that in larger filters having a large quantity of filter discs 24, it may be desirable to incorporate multiple troughs 40 for removal of the filter cake. For example, if the filter 10 includes twelve filter discs 24 it may be desirable to include two troughs 40, each having an associated opening 40 and each being configured to collect filter cake from six filter discs 24. It should be noted that the invention is not limited to a single trough 40 for each six filter discs 24 and that the above described embodiments are simply exemplary. Rather, numerous configurations are contemplated wherein one or more troughs 40 may be used with each trough 40 being associated with multiple discharge chutes 46 such that the number of outlet conduits 20 formed in the sidewall 14 of the pressure vessel 12 is less than the number of discharge chutes 46 contained therein.

It is noted that the number of troughs 40 formed in a given filter 10 may depend on such factors as the number of filter discs 24 present in the filter 10, the viscosity or flowability of the filter cake, and the minimum allowable angle of the bottom walls 42 which still provides sufficient gravity for collection and removal of the filter cake.

It is also noted that the outlet conduits 20 and associated openings 44 need not be in the longitudinal center of the trough 40. Rather, the opening 44 may be formed at any longitudinal location along the trough 40. Thus, for example, a single bottom wall 42 may extend from one longitudinal end of the trough 40 to an opening 44 at the opposing longitudinal end of the trough. Thus, the present invention may be easily adapted to various plant layouts wherein locating associated piping may be a concern.

Additionally, while the invention has been described with respect to a pressure vessel 12, the above trough configuration may be implemented into a tank or vat of a nonpressurized vessel. Thus, for example, a filter which draws a vacuum through the discharge tube 28 while maintaining an ambient pressure at the exteriors of the filter discs 24 may likewise incorporate a trough 40 such as described above.

While the present invention has been described in terms of a preferred embodiment, those of ordinary skill in the art will understand and appreciate that it is not so limited. Accordingly, many additions, deletions and modifications to the invention as disclosed may be effected without departing from the scope of the invention as set forth in the claims which follow.

What is claimed is:

1. A filtration apparatus, comprising:

a pressure vessel having a substantially cylindrical envelope and having a longitudinal axis;

a plurality of spaced, hollow, rotatable filter discs oriented transverse to the longitudinal axis of the pressure vessel and having interiors in communication with at least one filtrate discharge tube extending substantially parallel to the longitudinal axis; and at least one trough located completely within the pressure vessel envelope proximate the envelope and including a plurality of discharge chutes flanking the filter discs and leading to a collection portion of the at least one trough having an opening into an outlet conduit extending through the pressure vessel envelope, wherein the collection portion of the at least one trough includes at least one inclined bottom wall sloping toward the trough opening.

2. The filtration apparatus of claim 1, wherein the plurality of spaced, hollow, rotatable filter discs are positioned for rotation about an axis laterally offset from the longitudinal axis.

3. The filtration apparatus of claim 1, wherein each of the discharge chutes of the plurality include a mouth, two side walls extending vertically downward from the mouth to an inclined lower wall sloping downwardly away from the longitudinal axis, outer edges of the two side walls and the lower wall defining a mouth opening into the collection portion of the at least one trough.

4. The filtration apparatus of claim 3, wherein the at least one inclined bottom wall includes two inclined bottom walls sloping toward a longitudinal center of the at least one trough, the opening being disposed at approximately the longitudinal center of the at least one trough.

5. The filtration apparatus of claim 1, wherein the at least one inclined bottom wall includes two inclined bottom walls sloping toward a longitudinal center of the at least one trough, the opening being disposed at the longitudinal center of the at least one trough.

6. The filtration apparatus of claim 1, further including discharge scrapers proximate each disc of the plurality.

7. The filtration apparatus of claim 1, wherein the at least one trough extends longitudinally from at least one longitudinal end of the plurality of discs to another.

8. The filtration apparatus of claim 1, wherein the envelope is defined by a side wall of the pressure vessel and an outer extent of the at least one trough is comprised of a portion of the side wall.

9. The filtration apparatus of claim 8, wherein the collection portion of the at least one trough is located adjacent the portion of the side wall.

10. The filtration apparatus of claim 9, wherein each of the discharge chutes of the plurality include a mouth, two side walls extending vertically downward from the mouth to an inclined lower wall sloping downwardly away from the longitudinal axis, outer edges of the two side walls and the lower wall defining a mouth opening into the collection portion of the at least one trough.

11. The filtration apparatus of claim 10, wherein the at least one inclined bottom wall includes two inclined bottom walls sloping toward a longitudinal center of the at least one trough, the opening being disposed at the longitudinal center of the at least one trough.

12. The filtration apparatus of claim 11, wherein the plurality of spaced, hollow, rotatable filter discs are positioned for rotation about an axis laterally offset from the longitudinal axis.

13. The filtration apparatus of claim 1, wherein the at least one trough includes plurality of troughs and wherein there are a fewer number of troughs than there are a number of discharge chutes.

* * * * *